United States Patent
Rupieper et al.

[11] Patent Number: 6,144,454
[45] Date of Patent: Nov. 7, 2000

[54] METHOD FOR THE CHARACTERIZATION OF LACQUER COATED PLASTIC SURFACES

[75] Inventors: Paul Rupieper; Joachim Cramm, both of Wuppertal, Germany

[73] Assignee: Herberts GmbH, Wuppertal, Germany

[21] Appl. No.: 09/302,998

[22] Filed: Apr. 30, 1999

[30] Foreign Application Priority Data

May 2, 1998 [DE] Germany ............................ 198 19 602

[51] Int. Cl.[7] .................................................. G01B 11/06
[52] U.S. Cl. ............................................. 356/381; 118/712
[58] Field of Search .................................... 356/381, 372, 356/446; 118/712, 713; 427/10

[56] References Cited

U.S. PATENT DOCUMENTS 5,991,042  11/1999  Rupieper et al. ...................... 356/381

FOREIGN PATENT DOCUMENTS

| 350 891 | 1/1990 | European Pat. Off. . |
| 0 842 414 B1 | 5/1998 | European Pat. Off. . |
| 196 05 520 | 2/1996 | Germany . |

OTHER PUBLICATIONS

Osterhold et al., "Characterization of Surface Structures By Mechanical and Optical Fourier Spectra", European Coatings Journal, No. 1–2 (1995), pp. 32–35.

*Primary Examiner*—Frank G. Font
*Assistant Examiner*—Layla Lauchman
*Attorney, Agent, or Firm*—Pillsbury Madison & Sutro LLP

[57] ABSTRACT

Method for determining the visual effect of lacquer coatings on plastic surfaces, in which one or more successive lacquer layers is/are each applied onto the entire surface of a substrate consisting of a plastic test sheet joined with a metal test sheet and dried or cured, wherein the two test sheets are joined together in such a manner as to form a common plane, or planes arranged parallel to or optionally partially overlapping each other, one of the lacquer layers is applied in the form of a wedge with a layer thickness gradient, and, on the lacquer coated substrate surface obtained in this manner, one or more surface properties influencing the visual impression is/are then measured at least on the plastic test sheet by means of one or more optical measurement methods at measurement points distributed over the entire area in the form of a grid screen, and, solely on the metal test sheet, the particular thickness of the wedge-shaped lacquer layer is also measured.

11 Claims, 1 Drawing Sheet

1

METHOD FOR THE CHARACTERIZATION OF LACQUER COATED PLASTIC SURFACES

FIELD OF THE INVENTION

This invention relates to a method for the characterisation of lacquer coated plastic surfaces with regard to the visual effect thereof.

The visual effect of a lacquer coated surface arises from the interplay of various optical impressions, such as gloss, texture and colour tone, which in turn is composed of colour location, brightness and colour intensity. In the case of multilayer lacquer coatings, the visual impression is generally influenced not only by the outer lacquer layer, but also by one or more underlying lacquer layers. Numerous methods for characterising a lacquer coated surface which are suitable for describing the visual effect on the observer's eye are known. Examples are the methods based on optical principals known to the person skilled in the art for measuring gloss, for measuring haze, for measuring colour tone (colorimetry) and for determining surface textures. One essential parameter influencing the visual effect of a lacquer coated surface is the thickness in which the lacquer layer concerned or, in the case of a multilayer lacquer coating, one or more lacquer layers have been applied.

BACKGROUND OF THE INVENTION

The human eye functions in such a manner as to perceive the visual impression of a lacquer coated surface as a whole. DE-C-196 05 520 describes a method for determining the visual effect of lacquer coatings. This method involves applying one or more lacquer layers onto the surface of a plane substrate and drying or curing it/them, wherein one of the lacquer layers is applied with a layer thickness gradient, and, on the lacquer coated surface obtained in this manner, one or more surface properties influencing the visual impression is/are then measured by means of one or ore optical measurement methods at measurement points distributed over the entire area in the form of a grid screen, and the particular thickness of the wedge-shaped lacquer layer is also measured. Substrates having a plane surface which are used here are preferably test plates or sheets. These preferably consist of metal. Application of the method known from DE-C-196 05 520 to lacquer coated plastic surfaces is limited by the nature of plastic substrates. Elaborate and complex measurement methods must be used to determine the thickness of lacquer layers on plastic substrates nondestructively, for example the thermal wave method, which may only be performed after calibration on a lacquer layer of the same type and of a known thickness, or the light section method, which is restricted to use on clear lacquer layers.

SUMMARY OF THE INVENTION

The object thus arises of providing an efficient method for characterising lacquer coated plastic surfaces with regard to the visual effect thereof as a function of the thickness of a lacquer layer and, in particular, of further developing the method known from DE-C-196 05 520 with regard to the use thereof on lacquer coated plastic surfaces. In particular, the method should overcome the limitations relating to the measurement of the thickness of lacquer layers on plastic substrates. The method should provide reproducible measurement results which correlate well with the integrating function of the human eye and it should reveal the dependency on layer thickness as distinctly as possible. It should be possible to use the method for lacquer development, for quality control in lacquer production, in the development and monitoring of lacquer coating processes, including both the application and the drying processes.

It has been found that this object is achieved by the method provided by the invention for determining the visual effect of lacquer coatings on plastic surfaces, which method is characterised in that one or more successive lacquer layers is/are each applied onto the entire surface of a substrate consisting of a plastic test sheet joined with a metal test sheet and dried or cured, wherein the two test sheets are joined together in such a manner as to form a common plane, or planes arranged parallel to or optionally partially overlapping each other, one of the lacquer layers is applied in the form of a wedge with a layer thickness gradient, and, on the lacquer coated substrate surface obtained in this manner, one or more surface properties influencing the visual impression is/are then measured at least on the plastic test sheet by means of one or more optical measurement methods at measurement points distributed over the entire area in the form of a grid screen, and, solely on the metal test sheet, the particular thickness of the wedge-shaped lacquer layer is also measured.

The layer thicknesses are in particular measured by means of a non-destructive layer thickness measurement method applicable only to metal substrates.

The process may be used to determine the visual effect of lacquer coatings solely on plastic surfaces. In this case, it is sufficient to measure the optical properties solely on the plastic sheet. If the optical properties are also measured on the metal sheet, it is in particular possible to make visual assessments of surfaces of composite substrates consisting of plastic and metal components.

The optical measurements are preferably performed using a grid screen which is distributed over the entire area of the lacquer coated surface of the plastic test sheet; the same applies to the measurement of layer thickness with regard to the lacquer coated surface of the metal test sheet.

A rectangular plastic test sheet joined to a likewise rectangular metal test sheet, which are joined together in such a manner as to form a common plane, or planes arranged parallel to or optionally partially overlapping each other, is, for example, used as the substrate having a plane, in particular smooth, uncurved surface. The rectangular test sheets of metal and plastics conventional in the lacquer industry of any desired dimensions, for example of the order to 150 to 300 mm×600 mm are in particular suitable for the production of the substrates consisting of a plastic test sheet joined with a metal test sheet. One or both of the test sheets may be precoated with a single or multilayer coating on the surface to be coated. The two test sheets may accordingly exhibit surfaces to be coated which are different or identical in nature. The metal test sheets are preferably those made from steel. The two rectangular test sheets have, for example, at least one matching edge length, for example by having an identical format or by the format of one test sheet being, for example, double the format of the other test sheet. The metal test sheet and the plastic test sheet may be joined together on the reverse sides thereof which are not to be coated without overlapping. To this end they are preferably, for example, joined by means of their edges, for example, of identical length and, in this manner, provide a substrate having surfaces which form a common plane, i.e. the metal test sheet and the plastic test sheet are in a parallel arrangement. The two metal and plastic test sheets may, however, be combined to form a substrate in such a manner that they partially overlap and the surfaces to be coated thereof form planes arranged parallel to each other. In this case, they are joined not edge to edge, but instead with a partial overlap. The join may here be achieved on the reverse sides, which are not to be coated, of the two test sheets or one test sheet is placed on the other test sheet. In this case, the test sheets are preferably of different areas, such that the smaller test sheet may be placed on the larger; for example a plastic test sheet is placed on a larger metal test sheet. In so doing, they preferably form a common outer edge, for example of the same length. The manner in which the two test sheets are joined is freely selectable; the two test sheets are preferably joined using adhesive tape on the reverse sides which are not to be coated or, in the case of an overlapping join, by sticking one test sheet onto the other, for example using double-sided adhesive tape. The double-sided adhesive tape may here join the two test sheets over all or only part of the area, for example in strips.

The method according to the invention is applicable to lacquer coating of any desired plastic substrates. There is no restriction with regard to the plastic. Suitable examples of plastics are polypropylene, polyamide, polycarbonate and ABS plastics.

The metallic test sheets are also not subject to any restriction. Sheets made from ferromagnetic material, such as for example steel, are particularly suitable.

The method according to the invention is not subject to any restriction with regard to the nature of the lacquers or lacquer layers. The surfaces to be characterised may accordingly be single layer or multilayer lacquer coatings which have been produced using pigmented and/or unpigmented coating compositions. Examples are clear lacquers, coloured and/or effect base lacquers, topcoat lacquers and primers. The lacquer layers may be produced using solvent-free, solvent-based or aqueous liquid lacquers or powder coatings. The coating compositions may be single or multi-component lacquers, they may comprise physically drying or chemically crosslinking systems. In the case of chemically crosslinking systems, crosslinking may be inducible thermally or by high-energy radiation. In connection with the present invention, lacquer drying may mean physical drying or chemical crosslinking of a lacquer layer at ambient or elevated temperature, for example by stoving or under the action of radiant heat (IR radiation) or also chemical crosslinking of a lacquer layer induced by high-energy radiation, for example UV or electron beam radiation.

The lacquer or, in the case of multilayer lacquer coatings, the lacquers is/are in each case applied onto the entire substrate surface, i.e. onto both the metallic and the plastic portions of the substrate surface. The individual coating operations here proceed without interruption, i.e. in each coating operation the plastic and metal surfaces of the substrate are continuously lacquer coated in the same manner while maintaining constant coating process parameters. This ensures that the layer thickness(es) of the individual lacquer layer(s) match at corresponding positions on the two joined test sheets. In special cases, in which there is a deviation between the layer thicknesses achieved on the plastic and metal parts or on corresponding positions of the plastic and metal parts of the substrates, the method according to the invention may be performed such that an appropriate layer thickness correction factor obtained from previous calibration is taken into account.

If the surface of a single layer lacquer coating is to be characterised, the lacquer concerned is applied with a layer thickness gradient by spraying, i.e. in the form of a wedge, and dried. The layer thickness gradient may here comprise a wide range, for example a range of between above 0 and 100 $\mu$m. Application and/or subsequent drying may be performed in such a manner that the substrate is in a horizontal position during said operation. Preferably, however, application or drying, particularly preferably application and drying in particular of the lacquer layer applied in a wedge shape, proceed on a substrate which is oriented non-horizontally, particularly preferably vertically. The zone of the greatest layer thickness of the lacquer layer applied in a wedge shape is here preferably located at the lower end, i.e. the end closer to the ground. In order to ensure reproducibility, application is preferably performed by means of a conventional automatic machine, as is, for example, known from EP-B-0 350 891. The layer thickness gradient may, for example, preferably be produced by the lacquer layer concerned being applied in several, for example two or more, spraying cycles, wherein the spray zones only partially overlap.

It is immaterial in the method according to the invention which layer is applied in a wedge shape (gradient). Conveniently, the layer applied in a wedge shape will be the one whose effect on the overall visual impression is of interest.

In the case of multilayer lacquer coatings, for example the base lacquer/clear lacquer two layer lacquer coatings known in automotive lacquer coating, in particular base lacquer/clear lacquer two layer effect lacquer coatings, the same explanations already stated in the preceding paragraph apply in principle, wherein one of the lacquer layers forming the multilayer lacquer coating is applied with a layer thickness gradient. For example, the colouring and/or effect base lacquer layer or the clear lacquer layer of a base lacquer/clear lacquer two layer lacquer coating may be applied with a layer thickness gradient.

In the method according to the invention, one or more zones on the metallic part of the substrate are preferably left uncoated on application of the layer applied as a gradient which is of interest. These zones may be formed, for example as strips, for example at the edge of the metallic part of the substrate. This may be achieved, for example, by masking the uncoated zones, for example with strips of adhesive tape, on application of the layer assuming the gradient form. The other layers are applied in these zones in the same manner as on the entire substrate. In practice, for example, the masking may be removed to this end before application of a particular further layer. In this manner, it is possible additively to determine the layer thickness of the layer applied in gradient form at the individual measurement points by comparison with the zones left uncoated.

The method according to the invention is performed in such a manner that, after careful calibration of the measurement system, the lacquer coated substrate may be measured n times with regard to the relevant surface property influencing the visual impression by means of optical measurement methods in the form of a grid consisting of n measurement points extending over the entire surface of the plastic test sheet, wherein for each measurement point the dry layer thickness of the relevant wedge-shaped lacquer layer is also measured at a corresponding point on the metal test sheet. The number of measurement points n is preferably approx. 400 to approx. 1000. Layer thickness is here determined by non-destructive methods which may be performed solely on metallic substrates. Such methods in particular comprise the layer thickness measurement methods known to the person skilled in the art for this purpose, such as for example capacitive or eddy current methods, but particularly preferably layer thickness measurement methods which operate magnetically or magneto-inductively (as, for example, described in H. Kittel, *Lehrbuch der Lacke und Beschichtungen*, volume 8/1, Verlag W. A. Colomb, 1980, pages 140 et seq. and *Glasurit-Handbuch Lacke und Farben*, Curt R. Vincentz Verlag, Munich, 1984, pages 292 et seq.); layer thickness is preferably determined on the preferred steel test sheets using magneto-inductive measurement methods. For example, the method according to the invention is preferably performed in such a manner that two or more measurements are made along a line of identical layer thickness of the lacquer layer concerned. For example, starting from a low layer thickness and proceeding to the greatest layer thickness, measurements may be made in each case along equidistant lines. In this manner, each individual line comprises equal layer thicknesses. The various equidistantly arranged lines are associated with different layer thicknesses. For example, a measurement grid comprising a total of approx. 400 to approx. 1000 measurements per test sheet is registered. In the case of 500 measurement points, for example, it is possible to record 25 measurements along each of 20 different lines of equal layer thickness. The spacing and number of lines and the measurement points are here arranged such that preferably at least one measurement point is measured per square centimetre of lacquer surface.

The method according to the invention in particular allows the optical measurement points obtained from the plastic test sheet to be plotted on a correlation diagram relative to the particular associated thickness of the wedge-shaped lacquer layer. For assessment purposes, the measurements obtained may be read from the y-axis, while the associated layer thicknesses, optionally taking account of the above-mentioned correction factor, may be read from the x-axis of a correlation diagram. An unmistakable pattern of n points, which is comparable to a finger print, is obtained for the property of the lacquer coated plastic surface which is to be characterised. n here means any desired number which is selected as a function of the desired measurement accuracy. A possible method for assessing the visual properties of a lacquer coated plastic surface is thus provided. In particular, it is possible to assess whether and how visual properties are determined by defined application and drying conditions and by a defined composition of one or more lacquers which are used to coat the plastic surface.

The visually discernible properties of a lacquer coated surface are influenced by the complex interplay of numerous variable parameters of the lacquer material, lacquer application and lacquer drying. This interplay influences, for example, the occurrence of phenomena perceptible by the eye and the extent of such phenomena, such as colour tone, brightness and/or colour flop (optical anisotropy), levelling, tendency to sag, orange peel effect, microtexture, spray mist absorption capacity, solvent attack effects, cloudiness in effect lacquer coatings, hiding power, gloss, haze; phenomena which ultimately have an impact on the visual impression of a lacquer coated surface. Each of these properties may form the basis for measurements to be performed in the method according to the invention.

Examples of visually discernible and measurable properties are gloss, haze, surface texture with a long-and short-wave component, colour tone, for example colour location, colour intensity, brightness.

Examples of methods usable for the purposes of the method according to the invention for measuring the gloss of lacquer coated plastic surfaces are the conventional goniophotometric methods based on the principle of light reflection known to the person skilled in the art, as described, for example, in H. Kittel, *Lehrbuch der Lacke und Beschichtungen*, volume 8/1, Verlag W. A. Colomb, 1980, pages 240 et seq., *Glasurit-Handbuch Lacke und Farben*, Curt R. Vincentz Verlag, Munich, 1984, pages 239 et seq. and DIN 67530. Gloss measurement instruments preferably used for the purposes of the method according to the invention are conventional commercial instruments, such as for example the Microgloss® and Micro-Tri-Gloss® instruments sold by the company BYK-Gardner.

Examples of methods usable for the purposes of the method according to the invention for measuring the haze of lacquer coated plastic surfaces are the conventional goniophotometric methods also based on the principle of light reflection known to the person skilled in the art (as described, for example, in *Glasurit-Handbuch Lacke und Farben*, Curt R. Vincentz Verlag, Munich, 1984, page 240). Conventional commercial measurement instruments familiar to the person skilled in the art may be used. One measurement instrument preferably used for the purposes of the method according to the invention for determining haze is, for example, the Microhaze® instrument sold by the company BYK-Gardner.

Examples of methods usable for the purposes of the method according to the invention for the colorimetry of lacquer coated plastic surfaces are the conventional methods known to the person skilled in the art for determining the reflection curves of light, from which the calorimetric parameters L*, a* and b* conventional in the CIELAB system may be calculated (as described, for example, in H. Kittel, *Lehrbuch der Lacke und Beschichtungen*, volume 8/1, Verlag W. A. Colomb, 1980, pages 252 et seq. and *Glasurit-Handbuch Lacke und Farben*, Curt R. Vincentz Verlag, Munich, 1984, pages 220 et seq.). Any conventional measurement instruments familiar to the person skilled in the art may be used. One calorimetric instrument preferably used for the purposes of the method according to the invention is, for example, the X-Rite MA 58 instrument sold by the company X-Rite; one measurement instrument preferably used for determining brightness is, for example, the Micrometallic® instrument sold by the company BYK-Gardner.

One example of a method usable for the purposes of the method according to the invention for determining the long- and short-wave component of surface texture of lacquer coated plastic surfaces is the goniophotometric method known to the person skilled in the art based on the principle of light reflection modulated by surface textures. Any conventional measurement instruments familiar to the person skilled in the art may be used. For example, the Wave-scan® measurement instrument sold by the company BYK-Gardner (c.f. *European Coatings Journal*, no. 1–2 (1995), pages 32–35) is preferably used in the method according to the invention.

It is preferred in the method according to the invention to perform those measurements which give rise to differing measurement results as a function of the angle of illumination and/or observation on such substrates which were in a non-horizontal position, preferably in a vertical position during lacquer application and/or drying, preferably during application and drying in particular of the lacquer layer applied in a wedge shape. It is particularly preferred if the zone of the greatest layer thickness of the lacquer layer applied in a wedge shape was located at the lower end of the substrate, i.e. the end closer to the ground during lacquer application and drying. This procedure gives rise to particularly meaningful and differentiating correlation diagrams. Many of the optical measurements are performed with measurement instruments which emit an illuminating beam and make the measurement, for example, on the reflected beam; these instruments accordingly have an illumination direction, from which the subject is illuminated, and an opposing observation direction (measurement direction). In the above-stated preferred embodiment, it is particularly preferred, irrespective of the illumination and/or observation angle on the substrate selected for the measurement, if the illumination and/or observation directions run in the direction of one axis of the substrate or 180 degrees contrary thereto. The axis selected for this purpose is preferably that which ran from the top downwards during lacquer application and/or drying, preferably during lacquer application and drying on a non-horizontal, preferably vertical substrate. It depends upon the nature of the lacquer to be investigated whether it is preferred here to provide illumination in the direction of the axis or against the axis.

The method according to the invention is also applicable to lacquer and binder development work. For example, it is possible to determine the influence of lacquer composition on the visual effect of a single or multilayer lacquer coating on plastic surfaces obtained using the lacquer while maintaining defined application and drying conditions. For example, the visual effect of a lacquer coated plastic surface may be dependent upon the nature and proportion of the binder in the lacquer, upon the nature and quantity of the volatile substances, such as for example solvents, upon the nature and quantity of additives and upon the nature and quantity of pigments and extenders. The method according to the invention may also successfully be used as early as during the styling phase, for example when formulating novel, hitherto unknown (effect) colour tones. It is also possible to use the method according to the invention to verify the stability of a lacquer over an extended period, optionally under specific conditions, for example the storage and circulating line stability thereof, or to verify the suitability of a lacquer for a predetermined lacquer coating process. If, for example in the case of a lacquer having good storage or circulating line stability, no change in effect, colour tone or surface texture of the lacquer coated plastic surfaces is found even over an extended period, this is manifested by the unchanged pattern in the corresponding correlation diagrams produced using the method according to the invention.

The method according to the invention may also be used in quality control during lacquer production, for example for approving colour tone. In this case, substrates with the lacquer to be tested are produced under defined conditions and the corresponding correlation diagrams are compared for correspondence with the reference diagram as the approval criterion. Variations in the lacquer material may rapidly and reliably be detected and corrected by influencing the production process appropriately. It is frequently possible to detect not only the variation itself but also the cause thereof by means of the correlation diagrams.

The method according to the invention may furthermore be used in the development of lacquer coating processes, including both the application and the drying processes. For example, by using a single lacquer or, in the case of multilayer lacquer coatings, the same lacquers, and ensuring that all drying parameters are held constant, it is possible to investigate the influence of application parameters on the visual effect of the lacquer coated plastic surface. It is also possible to maintain constant application parameters and to vary the drying parameters. Examples of application parameters which may be varied are atomospheric humidity, temperature, nature and mode of operation of the spray device, voltage in electrostatic application, nature and layer thickness of other lacquer layers not applied as a wedge of a multilayer lacquer coating. Examples of drying parameters which may be varied are flashing-off conditions, such as flashing-off temperature and period, temperature/time heating curve of the drying oven, drying temperature or object temperature itself, stoving period, atmospheric humidity. The method according to the invention is preferably performed such that only one application or drying parameter is varied, while the other application or drying parameters are held constant. The correlation diagram or diagrams obtained using the method according to the invention in each case represent the influence of the application and/or drying parameter on the visual effect of a lacquer coated plastic surface.

For example, it is possible to determine the optimum processing window of a defined lacquer with regard to atmospheric humidity and temperature during the application thereof, within which window the visual impression and consequently so too the correlation diagram obtained using the method according to the invention are constant, i.e. it is possible to define a reliable processing range for a given lacquer.

The method according to the invention may accordingly also successfully be used for monitoring lacquer coating processes, including monitoring of both application and drying. For example, if it is ensured that the lacquer material used complies with the specifications (which, as already mentioned above, may also be verified by means of the method according to the invention), deviations from the defined lacquer coating process (for example non-compliance with defined application and/or drying parameters) may rapidly be detected and corrected by using the method according to the invention. In this case too, it is frequently possible to detect not only the variation itself but also the cause thereof from the correlation diagrams.

One particular benefit of the method according to the invention is that it is possible to study the interaction of the lacquer coating process and the lacquer formulation. For example, it may be desired to produce lacquer coated plastic surfaces having an identical visual effect on different lacquer coating plants with different, predefined application and/or drying parameters. By plotting suitable correlation diagram (s) using the method according to the invention, it is accordingly possible, for example, to discover a suitable additive system for the lacquer, by means of which the same lacquer may in principle be used in each case, but the lacquer may in each case be adapted to the specific conditions of different lacquer coating plants with the suitable additives. It is thus possible for plastic components lacquer coated in different coating plants to have the same visual impression, which is manifested by an identical pattern in the correlation diagram.

A preferred embodiment of the present invention involves using the method for determining the visual effect of lacquer coatings on the surfaces of composite substrates consisting of plastic and metal components. In this case, one or more successive lacquer layers is/are each applied onto the entire surface of a substrate consisting of a plastic test sheet joined with a metal test sheet and dried or cured, wherein the two test sheets are joined together in such a manner as to form a common plane, or planes arranged parallel to or optionally partially overlapping each other, one of the lacquer layers is applied in the form of a wedge with a layer thickness gradient, and, on the lacquer coated substrate surface obtained in this manner, both on the plastic test sheet and on the metal test sheet, one or more surface properties influencing the visual impression is/are then measured by means of one or more optical measurement methods at measurement points distributed over the entire area in the form of a grid screen, and, solely on the metal test sheet, the particular thickness of the wedge-shaped lacquer layer is also measured.

In the case of this embodiment, the method according to the invention is performed in such a manner that, after careful calibration of the measurement system, the lacquer coated substrate is measured with regard to the relevant surface property influencing the visual impression by means of optical measurement methods in the form of a grid extending over the entire, in particular rectangular, surface of the plastic test sheet, and in an analogous manner over the entire surface, for example having the same rectangular format, of the metal test sheet, the grid consisting of n measurement points in the case of the plastic test sheet and of m measurement points in the case of the metal test sheet, wherein for each measurement point the dry layer thickness of the relevant wedge-shaped lacquer layer is also measured at a corresponding point on the metal test sheet. m, as already defined for n, is here any desired number selected on the basis of the desired measurement accuracy. n and m may here assume identical or different values. The particular benefit of this embodiment of the method according to the invention is that both the n optical measurement points obtained on the plastic test sheet and the m optical measurement points obtained on the metal test sheet may be plotted on a correlation diagram relative to the particular associated thickness of the wedge-shaped lacquer layer. For assessment purposes, the optical n plus m measurements obtained may, for example, be read from the y-axis, while the associated layer thicknesses, optionally taking account of the above-mentioned correction factor, may be read from the x-axis of a correlation diagram. The n optical measurements obtained on the plastic test sheet may here preferably be plotted on the correlation diagram using a different colour or a different symbol to the m optical measurements obtained on the metal test sheet. Two unmistakable patterns of n or m points, each comparable to a finger print, are thus obtained for the property of the lacquer coated substrate surface which is to be characterised. In this manner, the visual properties of a lacquer coated surface of composite substrates consisting of plastic and metal components may be assessed outstandingly well. In particular, the degree of match between the visual properties of the two different surfaces may be assessed. Ideally, the two "finger prints" are, for example, congruent, corresponding to an exact match of the visual impression of the lacquer coated metal and plastic surface. This is of great significance when lacquer coating composite substrates consisting of plastic and metal components. Such substrates are conventional in the automotive sector, for example.

Examples of surface phenomena which may be detected and characterised using the method according to the invention are stated below.

The method according to the invention may advantageously be used for detecting and characterising microtexture, wetting behaviour, levelling, tendency to sag, solvent attack behaviour, orange peel effect using methods for determining the long- and/or short-wave components of the surface texture of lacquer coated surfaces, in particular by using the above mentioned Wave-scan® instrument.

The method according to the invention may furthermore advantageously be used with calorimetric methods, in particular by determining brightness, for detecting and characterising covering power, colour tone, brightness flop, colour flop, cloudiness, spray mist absorption, solvent attack effects and, in particular in the case of effect base lacquers, for detecting and characterising sagging phenomena.

The method according to the invention is preferably performed automatically. For example, the measurement instrument or two or more different measurement instruments simultaneously, for example a measurement instrument for measuring gloss, a measurement instrument for determining surface texture and a measurement instrument for determining brightness simultaneously, is/are passed over the lacquer coated substrate in accordance with the desired measurement grid by an automatically operating displacement means. This may, for example, be achieved by using a per se conventional X,Y measurement table. The pairs of values comprising measurements and, associated therewith, the thicknesses, optionally corrected as described above, of the lacquer layer applied in a wedge shape (in the case of the preferred embodiment of the method according to the invention such values are also (n≠m) or only (n=m) triplets of the form: "optical measurement obtained on the lacquer coated plastic surface/optical measurement obtained on the lacquer coated metal surface/layer thickness") may, for example, be stored in a connected computer, for example PC, and then printed out as one or more correlation diagrams. Advantageously, for example in order to perform unsupervised overnight measurements, the X,Y measurement table may be combined with an automatic sample changer, in which two or more substrates are stacked and successively transferred onto the X,Y measurement table for measurement. The method according to the invention may, for example, be performed using the apparatus known from DE-C 196 05 520 and in accordance with the procedure described therein.

The method according to the invention may successfully be used and constitutes a valuable tool in lacquer development, in quality testing for lacquer production purposes and in the development and monitoring of lacquer coating processes. The correlation diagrams obtained permit predictions to be made concerning the visual effect of a lacquer coated plastic surface produced using a defined lacquer and in accordance with defined application and/or drying conditions. The characteristic form of the correlation diagrams obtained using the method according to the invention allows a trend to be derived with regard to the change in visual effect of a lacquer coated plastic surface as a function of layer thickness of a particular lacquer layer.

The method according to the invention provides a good correlation with the visual impression of a lacquer coated plastic surface or, in the case of the preferred embodiment of the method according to the invention, with the visual impression of a lacquer coated surface of a composite substrate consisting of plastic and metal components as perceived by the human eye. The method may be performed efficiently and rapidly using little lacquer and with a single substrate composed in accordance with the requirements the method according to the invention.

DETAILED DESCRIPTION OF THE PREFERRED EMBODIMENTS

Figure 1:
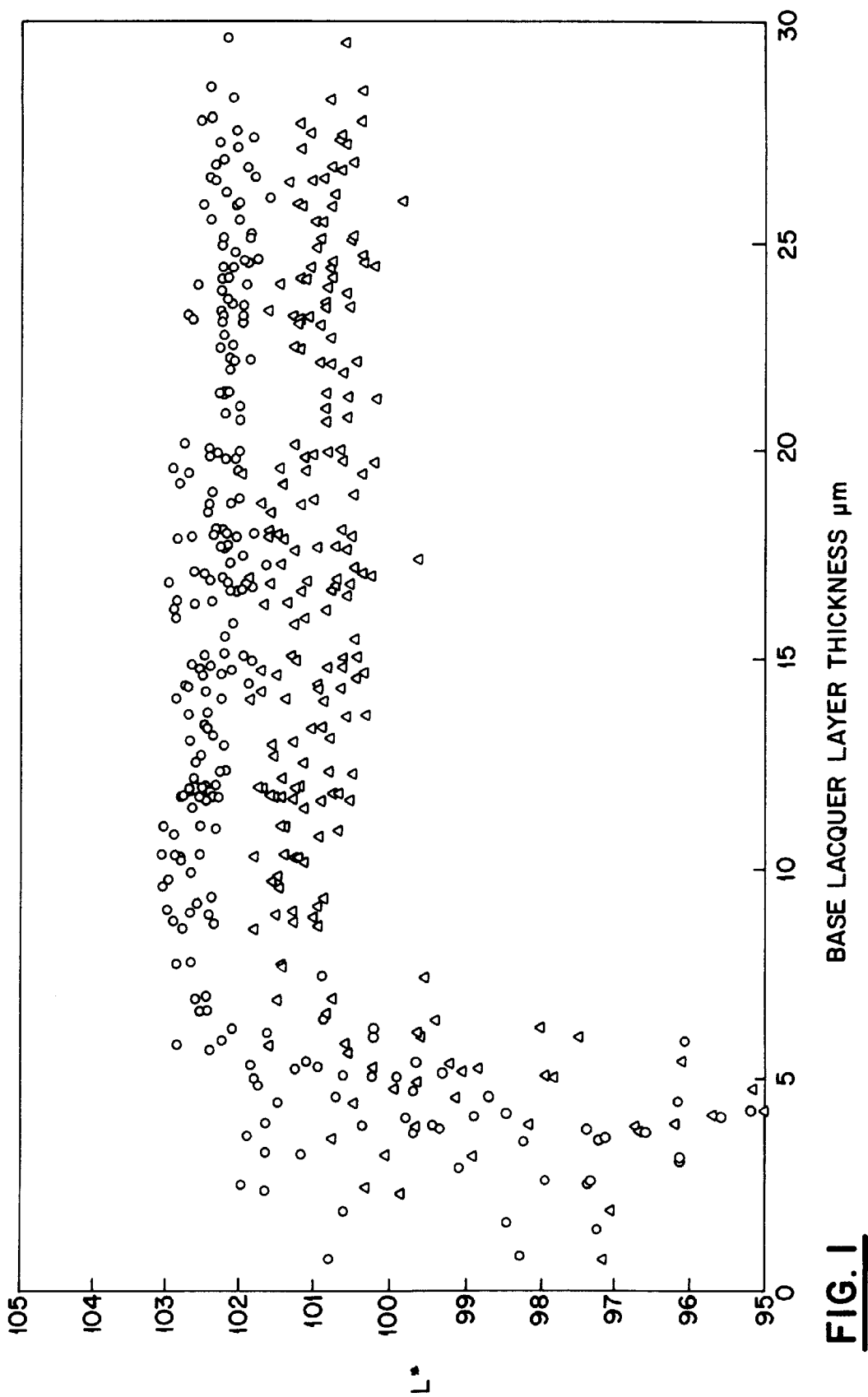
FIG. 1 is a correlation diagram of base lacquer layer thickness to brightness (L*).

The attached FIG. 1 shows an example of a brightness/base lacquer layer thickness correlation diagram of an effect base lacquer/clear lacquer two layer lacquer coating obtained using the method according to the invention. The diagram was obtained as described below:

First of all, a substrate was produced by sticking an uncoated rectangular polycarbonate test sheet (dimensions 150 mm×600 mm) by means of double-sided adhesive tape onto a steel test sheet of dimensions 300 mm×600 mm precoated with a conventional cathodic electrocoating and surfacer layer, wherein one of the 600 mm long edges of the plastic test sheet ended flush with one of the 600 mm long edges of the steel test sheet. The resultant overall substrate comprising the plastic and steel sheets standing in a vertical position (the 600 mm long edge being vertical) was coated by means of a conventional automatic spray unit (as described in EP-B-0 350 891) with a silver coloured effect base lacquer based on organic solvent with a layer thickness gradient of 0 to 30 μm dry layer thickness (greatest base lacquer layer thickness on the end of the substrate closer to the ground). After flashing-off for 5 minutes at room temperature, a conventional commercial two-component polyurethane clear lacquer was applied in a dry layer thickness of 40 μm by means of the same automatic spray unit and dried together with the base lacquer layer for 30 minutes at 80° C. (oven temperature). Brightness was measured in a grid-like manner both on the lacquer coated plastic surface and on the lacquer coated steel surface of the substrate using the Micrometallic® instrument from BYK-Gardner as a function of base lacquer layer thickness with an angle of illumination of 45 degrees and an angle of observation of 25 degrees to the gloss reflex. The directions of illumination and observation here lay transversely relative to the base lacquer wedge. At positions corresponding in each case to the brightness measurements, the base lacquer layer thickness was determined magneto-inductively solely on the lacquered steel surface of the substrate.

The following may be read from the correlation diagram, the y-axis of which states the brightness (L* according to the CIELAB system) and the x-axis of which states the base lacquer layer thickness in μm: the "finger print" (triangle symbols) obtained for the lacquer coated plastic surface is similar in shape to that obtained for the lacquer coated steel surface (circle symbols), but is lower overall as a consequence of the differing flashing-off behaviour of the base lacquer on the plastic substrate and on the steel substrate.

What is claimed is:

1. A method for determining the visual effect of lacquer coatings on plastic surfaces comprising:

applying one or more successive lacquer layers onto the surface of a substrate consisting of a plastic test sheet joined with a metal test sheet and drying or curing the applied layer or layers;

wherein the two test sheets are joined together in such a manner as to form a common plane, or planes arranged parallel to or partially overlapping each other, and one of the lacquer layers is applied in the form of a wedge with a layer thickness gradient;

measuring, on the lacquer coated substrate surface, one or more surface properties influencing the visual impression at least on the plastic test sheet by means of one or more optical measurement methods at measurement points distributed over the entire area in the form of a grid screen; and measuring, solely on the metal test sheet, the thickness of the wedge-shaped lacquer layer.

2. Method according to claim 1, characterised in that one or more surface properties influencing the visual impression is/are measured at measurement points in each case distributed over the entire area in the form of a grid screen on both the plastic test sheet and on the metal test sheet.

3. Method according to claim 1, characterised in that the particular thickness of the wedge-shaped lacquer layer on the metal test sheet is measured by means of a layer thickness measurement method applicable solely to metallic substrates.

4. Method according to claim 1, characterised in that measurement of the particular thickness of the wedge-shaped lacquer layer is performed by means of a non-destructive layer thickness measurement method.

5. Method according to claim 1, characterised in that the particular layer thickness is measured by means of conventional capacitive methods, eddy current methods, magnetically or magneto-inductively operating methods.

6. Method according to claim 1, characterised in that the metal test sheet and the plastic test sheet are each rectangular and are joined together by the edges or reverse sides thereof.

7. Method according to claim 1, characterised in that the test sheets are joined using adhesive tape on the reverse sides which are not to be coated or, in the case of an overlapping join, by sticking one test sheet onto the other using double-sided adhesive tape.

8. Method according to claim 1, characterised in that the measurement points obtained are plotted on one or more correlation diagrams of layer thickness and the particular associated or equivalent optical measurement point.

9. Method according to claim 8, characterised in that the correlation diagram is produced automatically by computer after the particular measurement.

10. Method according to claim 8, characterised in that the correlation diagrams produced are used as a finger print of a specific lacquer coating.

11. Method according to claim 9, characterised in that the correlation diagrams produced are used as a finger print of a specific lacquer coating.

* * * * *